United States Patent Office 3,055,805
Patented Sept. 25, 1962

3,055,805
PROCESS OF TREATING ACIDOSIS WITH T.H.A.M.
Gabriel G. Nahas, 18 King St., Englewood, N.J.
No Drawing. Filed Dec. 16, 1959, Ser. No. 859,851
7 Claims. (Cl. 167—65)

This invention is concerned with novel therapeutic compositions of matter containing as an active ingredient tris (hydroxymethyl) amino-methane, which is referred to hereinafter as T.H.A.M. The therapeutic compositions of the present invention are particularly useful in the treatment of "acidosis."

The term "acidosis" as used herein means an excess of acid or deficiency of "base" (meaning mineral cations) which, if not compensated by the body's regulatory mechanisms, results in a decreased pH i.e., an increase in hydrogen ion concentration. A fall in pH to a level of about 7.0 results in a state of coma, followed by functional failure of the heart. There are many different types of acidosis, the main types being "respiratory acidosis" and "metabolic acidosis."

Respiratory acidosis occurs when there is failure of pulmonary elimination of $CO_2$ and is manifested by increased concentrations of $CO_2$ and of $H_2CO_3$ in tissue and body fluids. Metabolic acidosis occurs when there is either a loss of "base" resulting from excessive excretions or direct loss of body fluids, or else a surplus of acid. In addition to loss of fluids there are many other causes of metabolic acidosis among which are (1) ketosis (common in diabetics), failure of excretion of acid waste products by diseased kidneys or failure of renal circulation, and (2) failure of gluconeogenesis from lactic acid in terminal stages of liver disease and in asphyxial states resulting in accumulation of lactic acid.

In addition to the above-mentioned causes of acidosis, it should be mentioned that many of the known acidifying drugs may cause acidosis. For example, ammonium chloride is acidifying since the ammonia portion is converted to urea by the liver, leaving an excess of $Cl^-$. Calcium chloride has an acidifying effect since the $Ca^{++}$ is excreted by the fecal route, and $Cl^-$ is retained. Acid drugs, such as aspirin, when taken in excess, may cause acidosis. Also, overindulgence of certain types of food and beverages may cause an acid stomach resulting in indigestion and heartburn. In many instances after an operation, post-operative acidosis occurs. Also, it has been observed that acidosis may exist in cases of extreme muscular fatigue. Instances of acidosis have been observed in case of increased intracranially pressure such as which occurs from a brain concussion.

Prior to this invention many therapeutic agents and techniques have been used in treating various forms of acidosis. The prior drugs and techniques, however, although useful in treating particular types of acidosis have not been satisfactory as therapeutic agents and methods for treating all types of acidosis. Also, while many buffer are known for controlling pH in invitro applications, the problems encountered and the solutions thereof are quite different and far more complex in attempting to find a suitable in vivo buffer. As will be observed hereinafter, the problems are even more complex in finding a particular in vivo "hydrogen-ion acceptor" useful in treating acidosis in general.

Accordingly, it is an object of this invention to provide a novel therapeutic composition of matter useful in the treatment of acidosis in general. A further object of this invention is to provide a novel therapeutic composition of matter useful in the treatment of respiratory acidosis. A still further object of this invention is to provide a therapeutic composition of matter useful in the treatment of metabolic acidosis. Yet a further object of this invention is to provide a novel therapeutic composition of matter which is an osmotic diuretic. A still further object of this invention is to provide a novel therapeutic composition of matter useful in the treatment of acidosis and which will not increase water retention by the kidneys. A further object of this invention is to provide a novel therapeutic composition of matter useful in the treatment of indigestion, heartburn and the like. Yet a further object of this invention is to provide a novel method for the treatment of acidosis in warm-blooded animals, including humans.

It has been found that the objects of this invention may be realized by administering to the body a drug comprising a suitable, non-toxic, carrier and an appropriate amount of T.H.A.M. as the active ingredient. T.H.A.M. is a white, crystalline solid which is quite soluble in alcohol and water. Prior to this invention, T.H.A.M. has had many in vitro applications, such as an emulsifying agent and a buffering agent. Heretofore, to my knowledge, it has not been used pharmacologically. A 43.4 percent solution of T.H.A.M. may be obtained in water. It has the following formula:

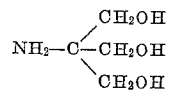

It has been found that the compositions of the present invention are most effective agents for the treatment of acidosis. The active ingredient thereof, i.e., T.H.A.M., possesses the following desirable properties:

(1) Contrary to many known in vitro buffers, T.H.A.M. is non-toxic when administered to the body in therapeutic doses.

(2) Contrary to many known in vitro buffers, T.H.A.M. is stable in the body. Accordingly, it is capable of functioning as a hydrogen ion acceptor in the body and does not break down into undesirable by-products which are toxic or cause undesirable side effects.

(3) Contrary to many sodium containing in vivo buffers, T.H.A.M. does not increase water retention by the kidneys. Accordingly, the therapeutic compositions of the present invention may be safely administered to patients, in the treatment of acidosis, who, in addition, are suffering from abnormal water retention by the kidneys. As a matter of fact the compositions of the present invention are not only a safe therapeutic agent for such patients, but have the further advantage of acting as an osmotic diuretic.

(4) Contrary to the bicarbonate type buffers, T.H.A.M. does not break down and release $CO_2$ in the body. Accordingly, the therapeutic compositions of the present invention may be used in the treatment of respiratory acidosis wherein there is present in the body abnormal $CO_2$ retention due to failure of pulmonary elimination of $CO_2$.

(5) T.H.A.M. functions as a hypoglycemic agent in the body, i.e., it lowers blood sugar.

The mode of administration of T.H.A.M., as well as the dosages thereof, varies depending upon the particular type of acidosis to be treated. Of course, the dosage should be in an amount sufficient to exert the desired hydrogen-ion acceptor activity but less than that which might cause undesirable side effects. The following are recommended procedures for the treatment of a number of different types of acidosis.

In the treatment of respiratory acidosis, an isotonic solution (0.3 molar) of T.H.A.M. is infused intravenously over a 1–3 hour period. The total daily dose in general is in a range from about 10–1000 mg./kg., and, preferably, about 100 to 600 mg./kg. The term "mg./kg." means mg. of active ingredient per kg. of the patient. If the active ingredient is not administered by infusion, but rather by injection, it is recommended that for a single injection the amount of active ingredient is not to exceed 8 mg./kg. Otherwise, undesirable side-effects may occur. In treating respiratory acidosis, intravenous administration is preferred over oral administration because of the better absorption of the active ingredient by intravenous route. If the active ingredient is administered orally, the dosage of the active ingredient should be about three times the amount administered intravenously.

In addition to the treatment of respiratory acidosis, there are many instances where the intravenous route of administration of the compositions of this invention is preferred. For example, the technique described above with respect to the treatment of respiratory acidosis is also useful in the treatment of post operative acidosis, diabetic acidosis, acidosis resulting from abnormal amount of acid drugs, acidosis resulting from heavy exercise, etc. Also, intravenous administration is preferred when the compositions of this invention are used as hypoglycemic agents. In such instance, the minimum daily dosage is usually higher than that administered in the aforementioned cases. When the compositions of this invention are used as hypoglycemic agents, good results are obtained when an isotonic solution (0.3 molar) of T.H.A.M. is infused intravenously over a 1–3 hour period; the daily dosage being in the range of about 100–1000 mg./kg., and, preferably, about 500 to 800 mg./kg.

When the compositions of this invention are employed as an osmotic diuretic, the active ingredient is administered in the form of a hypertonic solution (0.6 molar). Good results are obtained when a hypertonic solution of T.H.A.M. is infused intravenously over a 1–3 hour period; the daily dosage being in the range of about 50 to 500 mg./kg., and, preferably, about 50–300 mg./kg.

When the compositions of this invention are used for the treatment of mild indigestion, heartburn, and the like, the active ingredient is administered orally, such, for example, in the form of tablets, capsules and the like. In such instances, the daily dosage is generally in the range of about 0.5 to 10 grams, and, preferably, 2 to 6 grams.

The following are examples of compositions of the present invention:

Example 1

An isotonic solution (0.3 molar) of T.H.A.M. is prepared by combining the following ingredients in the amounts indicated.

| Ingredient: | Grams |
| --- | --- |
| T.H.A.M | 36.0 |
| NaCl | 1.75 |
| KCl | .37 |

Distilled water q.s. to give liter of solution.

Example 2

A hypertonic solution (0.6 molar) of T.H.A.M. is prepared by combining the following ingredients in the amounts indicated.

| Ingredient: | Grams |
| --- | --- |
| T.H.A.M. | 72 |

Distilled water q.s. to make one liter of solution.

Example 3

A hypertonic solution (0.6 molar) of T.H.A.M. is prepared by combining the following ingredients in the amounts indicated.

| Ingredient: | Grams |
| --- | --- |
| T.H.A.M. | 72 |
| Glucose | 40 |

Distilled water q.s. to make 1 liter of solution.

In the composition of Example 3, glucose is incorporated for the purpose of counteracting reduction of blood sugar level by T.H.A.M. due to the hypoglycemic activity of T.H.A.M.

Example 4

A tablet is compressed from a composition having the following formula:

| | Mg. |
| --- | --- |
| T.H.A.M | 250 |
| Corn starch | 50 |
| Magnesium stearate | 2 |
| Alginic acid | 8 |

The following experiment indicates the utility of the composition of this invention in combatting excess retention of $CO_2$ (the condition which exists in a patient suffering from respiratory acidosis).

Example 5

Carbon dioxide retention was induced in four human volunteers by administration of carbon dioxide in air. While carbon dioxide breathing was continued, tris hydroxymethylaminomethane (T.H.A.M.) was given intravenously. The increase in ventilation induced by carbon dioxide was greatly reduced or abolished during T.H.A.M. infusion through decrease in tidal volume. In the same period $CO_2$ output was reduced by 67 to 123 cc./min. Twelve to twenty-four percent of this retained $CO_2$ appeared in the urine during the infusion. Arterial blood pH increased by 0.08 to 0.18 pH unit but arterial $CO_2$ tension showed little change from levels observed before T.H.A.M. Alveolar $CO_2$ tension showed a transitory decrease of 3 mm. Hg. as T.H.A.M. was started but immediately returned to previous levels. When $CO_2$ breathing was continued after T.H.A.M. was discontinued, ventilation increased once more, but pH remained elevated, and arterial and alveolar $CO_2$ tension did not change. $O_2$ uptake remained essentially constant throughout except during two periods of marked hypoventilation with the highest dose when arterial hypoxemia was observed.

The following experiment indicates the utility of the compositions of this invention as an osmotic diuretic.

Example 6

Six essentially normal adults were infused intravenously with 517–997 ml. of a solution containing T.H.A.M., 300 millimoles/liter, sodium chloride—30 mm./l., and potassium chloride—5 mm./l. The infusions lasted 30 to 60 minutes. Blood pH and bicarbonate concentration rose. Endogenous creatinine clearance and serum concentrations of sodium and chloride remained unchanged. Serum potassium rose in 3 subjects by 0.2, 0.5, and 0.8 mm./l. Urinary excretion of sodium, potassium, bicarbonate and chloride increased markedly in all subjects. Chloride excretion during T.H.A.M. significantly exceeded the combined excretion of sodium and potassium in each case. The pH of the urines rose above 7.0 and approximately 10% of the filtered bicarbonate appeared in the urine, thus indicating an increase in both reabsorption and excretion of bicarbonate. In 3 subjects, the excretion rates for potassium and for chloride were greater than could be explained by the infusion rate plus the control period excretion rate. Urine flow in the control periods ranged from 6 to 13 ml./min. and behaved variably during T.H.A.M. administration. Recovery of T.H.A.M. from the urine varied inversely with its infusion rate. The changes reported may be best explained by the presence of an increased bicarbonate load and a non-reabsorbable cation in glomerular filtrate The invention in its broader aspects is not limited to the specific compositions and method described but departures may be made therefrom within the scope of the accompanying claims without departing from the principles of the invention and without sacrificing its chief advantages.

What is claimed is:

1. The method of treating acidosis in warm-blooded animals including humans, comprising administering to said animal a therapeutic composition of matter comprising a non-toxic carrier with tris (hydroxymethyl) aminomethane as the active ingredient, the active ingredient being in an amount sufficient to provide the desired hydrogen ion acceptor activity but insufficient to cause undesirable side effects.

2. The method of claim 1 wherein the therapeutic composition of matter is administered intravenously.

3. The method of claim 1 wherein the therapeutic composition of matter is administered orally.

4. The method of treating acidosis in warm-blooded animals including humans, comprising administering to said animal a therapeutic composition of matter comprising a non-toxic carrier with tris (hydroxymethyl) aminomethane as the active ingredient, said therapeutic composition being administered by intravenous infusion over a sufficient perod of time to administer a daily dosage range of from about 10 to 1000 mg./kg.

5. The method according to claim 4, wherein the therapeutic composition is administered over a 1 to 3 hour period and the daily dosage range is in an amount from about 100 to 800 mg./kg.

6. The method of treating acidosis in warm-blooded animals including humans, comprising administering to said animal a therapeutic composition of matter comprising a non-toxic carrier with tris (hydroxymethyl) aminomethane as the active ingredient, said therapeutic composition being administered orally, in a daily dose range of from about 0.5 to 10 grams of the active ingredient.

7. The method of treating acidosis in warm-blooded animals including humans, comprising administering to said animal a therapeutic composition of matter comprising a non-toxic carrier with tris (hydroxymethyl) aminomethane as the active ingredient, said therapeutic composition being administered by injection, the amount of active ingredient for a single injection not exceeding 8 mg./kg.

References Cited in the file of this patent

Chemical Abstracts, vol. 40, p. 5078$^7$ (1946), vol. 45, pp 4599$^i$–4600$^b$ (1951), vol. 48, p. 1014$^g$ (1954), vol. 51, p. 6747$^h$ (1957).

Nahas et al.: Am. J. Physiol. (197), pp. 1308–16, 1959.
Nahas et al.: Compt. rend. (249), pp. 2246–8, 1959.
Nahas et al.: J. Physiol. (Paris) (51), pp. 541–3, 1959.